March 8, 1960  R. H. POSTAL  2,928,048
ELECTRICAL MEASURING SYSTEM
Filed Aug. 27, 1956
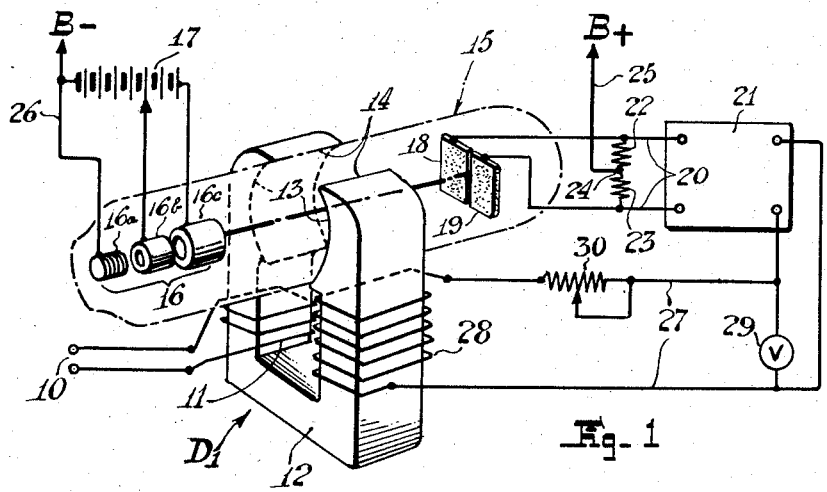
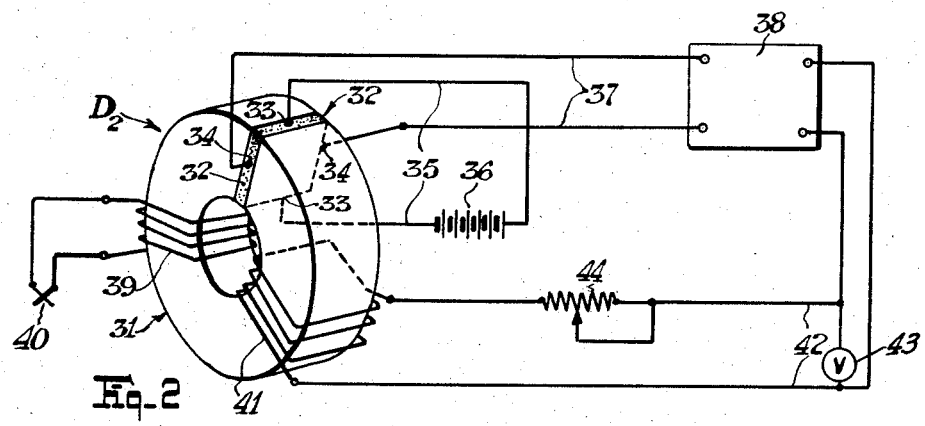
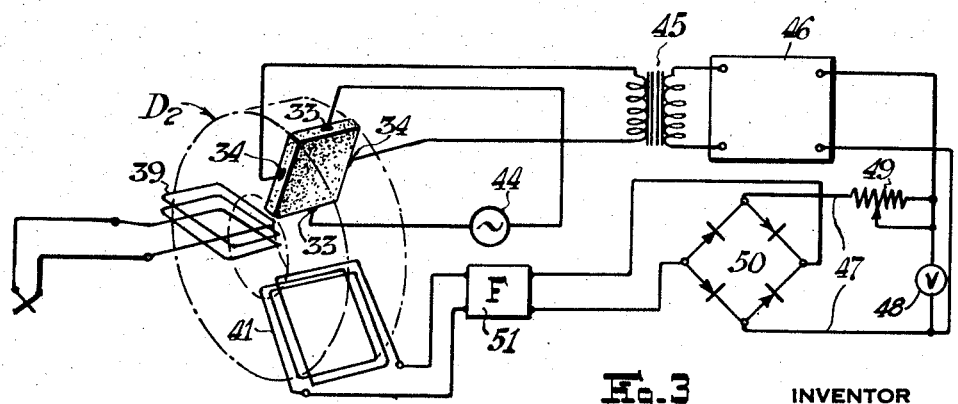
INVENTOR
Robert H. Postal
BY George H. Fritzinger
Agt.

United States Patent Office 2,928,048
Patented Mar. 8, 1960

2,928,048

ELECTRICAL MEASURING SYSTEM

Robert H. Postal, Clifton, N.J., assignor, by mesne assignments, to McGraw-Edison Company, Elgin, Ill., a corporation of Delaware Application August 27, 1956, Serial No. 606,440

1 Claim. (Cl. 324—99)

This invention relates to amplifier-feedback systems adapted for measuring minute potentials in terms of quantities of sufficient magnitude capable of being read by relatively insensitive meters or recording devices, and more particularly the invention relates to novel voltage-differential devices for such measuring systems which are adapted to provide the systems with both structural and operational advantages.

The general advantages of the amplifier-feedback type of measuring system lie in its stability and sensitivity enabling, for instance, the continuous recording of minute D.C. potentials by relatively insensitive recording devices. The typical voltage-differential device for such systems has comprised a light source, a sensitive galvanometer with a suspended mirror, and a split-plate photocell such, for instance, as is described in Asset et al. Patent 2,368,093. The disadvantages of this type of differential device are that it is expensive, cumbersome, vibration sensitive, and slowly responsive because of inertia and compliance effects in the galvanometer suspension.

By the present invention the aforementioned disadvantages are overcome by using a magnetic-type voltage differential device which is characterized by the use of a magnetic yoke wherein there appears a source component of flux derived from the voltage being measured and an opposing component of flux from the output of the feedback amplifier, and by the use of a flux-responsive device in the gap of the magnetic yoke for providing a voltage input to the feedback amplifier in accordance with the net flux in the yoke. Such voltage-differential device can be adapted for any desired impedance conditions by choice of the windings on the yoke, is instantly-responsive and vibration-insensitive because it employs no moving parts, is compact and rugged, and is highly sensitive.

A general object of the present invention is to provide an improved amplifier-feedback type of measuring system which has both structural and operational advantages over prior systems of this type.

A feature of the present system is that errors from remanence effects in the magnetic yoke are essentially eliminated by the use of feedback without need for superimposing a high-frequency magnetic field in the yoke as is typically done for this purpose. The elimination of the high-frequency field removes a possible source of error because any asymmetry in the wave form of the high-frequency source would produce D.C. flux components in the yoke with resultant error.

In accordance with the preferred embodiments of the invention, the flux-responsive device may be either a split-electrode electron beam tube or a Hall plate mounted in the gap of the magnetic yoke so as to provide a voltage output according to the net flux in the gap.

These and other objects and features of my invention will be apparent from the following description and the appended claim.

In the description of my invention reference is had to the accompanying drawings, of which:

Figure 1 is a schematic circuit diagram of one embodiment of my invention using a split-electrode electron beam tube;

Figure 2 is a schematic circuit diagram of a second embodiment of my invention using a Hall plate; and Figure 3 is a modification of the embodiment of Figure 2 adapted for the use of an A.C. feedback amplifier.

The embodiment of my invention shown in Figure 1 comprises a voltage-differential device $D_1$ having a pair of input terminals 10 adapted to be connected to a source of voltage to be measured. Connected to these terminals is a winding 11 on a ring-type magnetic core or yoke 12 having arcuate pole faces 13 defining a gap 14. Mounted crosswise in this gap is an electron beam tube 15 comprising an evacuated glass envelope carrying an electron gun 16 in one end of well-known form, such gun comprising, for example, an electron-emitting cathode 16a with an associated heater, and suitable accelerating and focusing anodes 16b and 16c which need not, however, be herein shown in detail. Suitable potentials for these anodes are supplied from a battery 17. Mounted in the opposite end of this envelope is a pair of metal plate electrodes 18 and 19 located, for example, in a common plane but having a minute separation in the direction of the flux through the gap 14 between their adjacent edges. The plate electrodes are connected by a circuit 20 to the input of an amplifier 21. Across this circuit are connected two resistors 22 and 23 in series having a common junction 24 connected by a lead wire 25 to a source of D.C. voltage marked B+, the negative side of this source marked B— being connected by a lead wire 26 to the cathode of the electron gun 16. Suitably located within the envelope are two soft iron pole pieces (not shown) which are in magnetic alignment with the pole pieces of the magnetic yoke 12 and which define therebetween a magnetic gap in alignment with the exit opening of the electron gun. Also, there may be a suppressor grid (not shown) associated with the electrode plates in well-known manner to prevent secondary emission passing from one plate to the other. For such and other details in the construction of such electron beam tube, reference may be had to Skellet Patent 2,720,558, dated October 11, 1955.

The electrodes of the electron gun and the accelerating potentials are so chosen that the electron beam from the electron gun is focused to a relatively small spot which, when undeflected, falls in the narrow gap between the plate electrodes 18 and 19 or equally on the two electrodes. Under this condition there is no voltage output in the circuit 20. However, when a magnetic flux is set up in the magnetic yoke 12 this flux deflects the electron beam towards one electrode plate and away from the other to provide a voltage output the magnitude and direction of which depends on the magnitude and direction of the flux in the magnetic yoke.

The voltage output from the electrode plates 18 and 19 is amplified by the amplifier 21 and fed back through a feedback circuit 27 to a feedback winding on the magnetic yoke, preferably a winding 28 separate from the input winding 11. The fed back voltage is poled so that it creates a flux in the yoke 12 in opposition to the source flux from the input winding 11. Connected in the feedback circuit is a measuring instrument in the form, for example, of a voltmeter connected across the output of the amplifier. In order that this voltmeter need not be a highly sensitive instrument, the amplifier 21 is provided with excess gain and only a portion of the amplifier output is fed back to the winding 28 as by providing an adjustable resistor 30 serially in the feedback circuit between the voltmeter and the winding. The result of the feedback is to reduce the flux in the magnetic yoke 12 approximately to the extent of the effective gain in the entire loop through the voltage-differential device, amplifier and feedback circuit.

Preferably, the magnetic yoke is made of Mumetal or other high-permeable soft magnetic material. Such Mumetal has a high residual magnetism of as much as 61%— that is, upon magnetizing the Mumetal to any desired extent short of saturation by a magnetomotive force and then removing that magnetomotive force, the flux will fall to a magnitude about 61% of its former value. However, in an amplifier-feedback system as here described, the residual flux is reduced by a factor equal approximately to the net gain in the entire loop. Thus, if the net gain is only 100, the error due to remanence effects in the magnetic yoke is already reduced to approximately .6%. Since remanence effects are in this way practically eliminated, there is no need for superimposing any high-frequency flux in the magnetic yoke, as is typically done.

By way of example, sensitivity of the voltage-differential device $D_1$ may be such that it provides 15 volts output in the circuit 20 with 1 gauss of flux in the gap 14. For a Mumetal core having a cross sectional area of .01 sq. in., an input coil of 1000 turns having a resistance of 2 ohms coupled to a thermocouple providing $5 \times 10^{-5}$ volts per degree centigrade rise in temperature, there will be a source flux in the core of about .4 gauss tending to give rise to an output voltage of 6 volts. In the present feedback system, this voltage will of course be reduced according to the net gain in the entire loop. By providing a suitable net gain in the entire loop and a sufficient gain to the point of the receiving instrument 29, sufficient power can be derived to operate relatively insensitive recording or indicating instruments from minute potential sources while still overcoming remanence effects as an appreciable source of error.

In Figure 2 there is shown a second embodiment of my invention wherein there is a voltage-differential device $D_2$ of a type using the Hall effect. This device again includes a magnetic yoke referred to as 31, which is preferably of a highly-permeable metal having a single air gap. In this gap there is a Hall plate 32, preferably of indium antimonide, indium arsenide or any other material having a high Hall coefficient, through which there is produced a magnetic field perpendicular to the plane of the Hall plate. To the end faces of the Hall plate there are electrically and mechanically fixed conductive metal terminal strips of which the pair at the top and bottom ends are current input terminals referred to as 33 and those at the front and back ends are voltage output terminals referred to as 34. Secured to the strips 33 are leads 35 connected across a source 36 of D.C. potential, and secured to the strips 34 are leads 37 connected to the input of a D.C. amplifier 38. As is well known, a Hall plate is characterized in that when a current is passed therethrough along one axis thereof in the plane of the plate and a magnetic flux is passed therethrough at right angles to the plate there occurs an angular rotation of the lines of equipotential which exist across the plate transverse to the direction of current flow. This angular rotation of the lines of equipotential will cause a potential to develop along the orthogonal axis in the plane of the plate, which potential is proportional to the product of the current and flux supplied through the Hall plate. Thus, in the present device, for a given potential of the source 36 there is produced a voltage across the terminals 34 which is proportional to the magnetic flux in the yoke 31.

The flux in the magnetic yoke is produced by a winding 39 which is to be connected to a source of potential to be measured such as a thermocouple 40, and a second winding 41 connected through a feedback circuit 42 to the output of the amplifier 38, the second winding being poled so that the flux produced thereby will oppose that of the winding 39. In the feedback circuit 42 there is a measuring instrument 43 and an adjustable voltage cutdown resistor 44 adapted to permit a high level output at the point of the measuring instrument by feeding back only a portion of the output of the amplifier, it being understood, however, that any desired amount of feedback can be obtained by choice of the propagation factors of the amplifier and feedback circuit. Thus, as in the previous embodiment, the net flux in the magnetic yoke is very small relative to the flux produced by the source winding 39 with the result that remanence effects are well-nigh fully overcome as a source of error. Although a Hall-effect device has a characteristically low output impedance providing for a substantial power gain, the voltage output at the terminals 34 can be improved by using more copper and more turns in the source winding 39. An advantage in the voltage-differential device $D_2$ utilizing the Hall principle over the differential device $D_1$ of my first embodiment lies in its greater simplicity and extreme compactness.

In the modification shown in Figure 3 there is employed the same Hall-effect device as before but an A.C. potential field source 44 is employed instead of the D.C. source 36. When the Hall plate is subjected to an A.C. potential field it provides an A.C. output across the terminals 34 which is dependent on the net flux in the magnetic yoke for any given voltage of the A.C. source. The advantage of obtaining an A.C. output voltage is that it can be stepped up by an input transformer 45 to effect any desired voltage gain from the Hall device itself notwithstanding that the output of the Hall plate has a characteristically low impedance; also, by obtaining an A.C. output voltage there can be employed an A.C. amplifier 46 having a characteristically more stable operation. The output of this amplifier is fed back through a feedback circuit 47 to the winding 41 on the magnetic yoke. This feedback circuit includes a measuring instrument 48 and an adjustable resistor 49; additionally, this feedback circuit now includes a full-wave rectifier 50 and filter 51 to provide a direct current energization of the winding 41. As before, the winding 41 is poled in opposition to the source winding 39 so as to reduce the flux in the yoke by the feedback current. Thus, in this modification there is obtained a voltage gain from the Hall device as well as from the amplifier 46 to provide a highly-sensitive instrument still in a highly simple and compact form. Moreover, the added gain from the Hall device enables operation at a still lower induction in the magnetic yoke with still more effective suppression of remanence effects in the magnetic material.

The embodiments of my invention herein described and claimed are intended to be illustrative and not limitative of my invention since the same are subject to changes and modifications without departure from the scope of my invention which I endeavor to express according to the following claim.

I claim:

An electrical measuring system comprising a ring-type core of high permeable magnetic material characterized as having a high remanence, said core being provided with an air gap, an input winding on said core to be connected to an electrical source to be measured for producing a magnetic flux in said core across said gap, means in said air gap free of moving parts and instantly responsive to the flux therein for producing an output voltage proportional to said flux, an electrical amplifier connected to said flux responsive means, and a feedback circuit connected to the output of said amplifier and including a feedback winding on said core poled to produce a flux in said core opposing the flux therein produced by said source to be measured, said amplifier-feedback loop having a net gain of a magnitude at least a multiple times greater than unity for reducing the effect of the remanence of said core on the operation of said system, an attenuating means connected in said feedback circuit between the output of said amplifier and said feedback winding, and a measuring instrument connected at a high level point in said feedback circuit between said amplifier and said attenuating means.

References Cited in the file of this patent

UNITED STATES PATENTS

| | | | |
|---|---|---|---|
| 2,059,786 | Gilbert | Nov. 3, | 1936 |
| 2,087,995 | Nolke | July 27, | 1937 |
| 2,548,176 | Semm et al. | Apr. 10, | 1951 |
| 2,551,265 | Hansen | May 1, | 1951 |
| 2,605,302 | Specht | July 29, | 1952 |
| 2,720,558 | Skellett | Oct. 11, | 1955 |
| 2,736,822 | Dunlap | Feb. 28, | 1956 |